(12) United States Patent
Welker

(10) Patent No.: US 7,358,479 B2
(45) Date of Patent: Apr. 15, 2008

(54) METHOD AND COMPUTED TOMOGRAPHY GANTRY FOR MEASUREMENT OF ROTATION ANGLE OF ROTOR

(75) Inventor: Ludwig Welker, Eggolsheim (DE)

(73) Assignee: Siemens Aktiengesellschaft, Munich (DE)

( * ) Notice: Subject to any disclaimer, the term of this patent is extended or adjusted under 35 U.S.C. 154(b) by 180 days.

(21) Appl. No.: 11/216,636

(22) Filed: Aug. 31, 2005

(65) Prior Publication Data
US 2006/0054798 A1 Mar. 16, 2006

(30) Foreign Application Priority Data
Aug. 31, 2004 (DE) .................... 10 2004 042 486

(51) Int. Cl.
*G01D 5/34* (2006.01)
*A61N 5/00* (2006.01)
(52) U.S. Cl. .................... 250/231.13; 250/231.14; 250/492.1
(58) Field of Classification Search .......... 250/231.13, 250/231.14, 231.15, 231.17; 341/6–8; 324/207.11
See application file for complete search history.

(56) References Cited

U.S. PATENT DOCUMENTS

| 4,644,573 | A | | 2/1987 | Palermo et al. |
| 4,978,847 | A | * | 12/1990 | Fukunaga et al. ..... 250/231.14 |
| 5,331,154 | A | * | 7/1994 | Kondo et al. .......... 250/231.17 |
| 6,772,101 | B1 | | 8/2004 | Tanaka et al. |
| 7,188,592 | B2 | * | 3/2007 | Baldi et al. .............. 123/90.11 |

FOREIGN PATENT DOCUMENTS

DE 100 38 296 A1 2/2002

OTHER PUBLICATIONS

"Phase Locked Loop (PLL)," Hermann.

* cited by examiner

*Primary Examiner*—Georgia Epps
*Assistant Examiner*—Stephen Yam
(74) *Attorney, Agent, or Firm*—Schiff Hardin LLP

(57) ABSTRACT

In a gantry for an x-ray computed tomography apparatus with a rotor and a stator and a device for measurement of the rotation angle as well as a method for measurement of the rotation angle, a disc is provided with markings that rotate relative to a detection device for detection of the markings. Electrical signals are generated by the detection device, and an evaluation device converts the signals into a measurement signal corresponding to the respective rotation angle. To increase the precision of the measurement, a low-pass filter is connected upstream of the evaluation device.

9 Claims, 3 Drawing Sheets

METHOD AND COMPUTED TOMOGRAPHY GANTRY FOR MEASUREMENT OF ROTATION ANGLE OF ROTOR

BACKGROUND OF THE INVENTION

1. Field of the Invention

The present invention concerns a gantry for an x-ray computed tomography apparatus with a device for measurement of the rotation angle of the gantry rotor relative to the gantry stator, and a method for measurement of the rotation angle.

2. Description of the Prior Art

An angle measurement device for the above purpose is known from DE 100 38 296 A1. In this known angle measurement device, magnetically scannable markings are applied on a rotatable disc. Given a rotation of the disc, the markings are scanned by scan heads. A signal generated by the scan heads can be interfered with due to fluctuations in the rotation speed of the disc, due to manufacturing-dependent tolerances in the size and geometry of the disc and/or the markings, as well as due to markings being imprecisely applied on the disc. These interferences lead to a reduced precision of the angle measurement. Attempting to increase the precision by a reduction of the manufacturing tolerances is complicated and cost-intensive.

SUMMARY OF THE INVENTION

An object of the present invention is to provide a rotation angle measurement device and method that avoid the disadvantages according to the prior art. In particular, such a device and a method for measurement of the rotation angle should allow the rotation angle to be measured as precisely as possible. A further object of the invention is to make the measurement of the rotation angle minimally susceptible to interferences.

This object is achieved in accordance with the invention by a device for measurement of the rotation angle of a rotor relative to a stator in a gantry of an x-ray computed tomography apparatus, whereby a low-pass filter for filtering the measurement signal is connected upstream from the evaluation device. Unwanted signal fluctuations can be filtered out with the low-pass filter. Such signal fluctuations can arise, for example, due to tolerances in the size of the markings and/or due to markings being imprecisely positioned on the disc. The low-pass filter enables a particularly precise determination of the rotation angle. As a result of the use of a low-pass filter, discs or markings with greater manufacturing tolerances and/or discs with markings positioned less precisely can be used. The manufacturing outlay can be reduced and the costs for the manufacturing can be lowered.

In an embodiment of the invention, the low-pass filter is formed by a PLL (phase-locked loop) circuit. The PLL circuit is preferably a digital PLL circuit. A PLL circuit is a regulating circuit in which the regulation is generated by a constant phase. The functional principle of PLL circuits is described in the article "Phase Locked Loop (PLL)" by Prof. Dr.-Ing. Hermann of the Fachhochschule München, available at www.fh-muenchen.de/home/fb/fb06/professoren/hermann/unterlagen/vorlesungen/p 11.pdf, the contents of which are incorporated herein by reference. A digital PLL circuit can be realized in a particularly simple manner. With the PLL circuit it is possible to reconstruct a disturbed reference clock given a known nominal frequency. If the rotation frequency of the rotor is known, the nominal frequency is thus the ideal, undisturbed frequency of the acquired signals. The nominal frequency can be determined in a simple manner given a known rotation frequency and given a known number of markings uniformly distributed on the disc. If v is the rotation frequency of the disc and N is the number of the markings, the nominal frequency thus corresponds to the product N*v.

With a PLL circuit and a known nominal frequency, the rotation angle can be measured with particular precision and largely independent of external interfering influences such as, for example, rotation frequency fluctuations of the disc, tolerances of the disc and the like.

The markings can be through-holes provided in the disc. The through-holes are preferably slits. The through-holes or slits can be detected with light barriers. It is also possible to apply magnetic, optical, electrical or similar markings on the disc. Such markings can be detected with magneto-sensitive or photosensitive elements and the like.

According to the invention, the rotor and the stator form the gantry of an x-ray computed tomography apparatus. An optimally precise determination of the rotation angle is necessary in x-ray computed tomography for a qualitatively high-yield image reconstruction. Given a flawed measurement of the rotation angle, for example, it is possible that the minimum rotation angle necessary for an exposure is under-run. The minimum rotation angle can essentially be equated with a minimum measurement time given a known rotation frequency of the gantry. An under-run of the minimum rotation angle or the minimum measurement time can lead to a significant worsening of the quality of the exposure, for example of the signal-to-noise ratio. A low-pass filter connected upstream from the evaluation device enables suppression or filtering of signal fluctuations that would lead to a flawed measurement of the rotation angle. In particular a low-pass filter with a PLL circuit is suitable for an x-ray computed tomography apparatus. The gantry of an x-ray computed tomography apparatus essentially rotates with predetermined discrete rotation frequencies so that the nominal frequency for the PLL circuit can be determined in a simple manner. The precision of the measurement of the rotation angle can be implemented without complicated or cost-intensive design changes of the disc and/or of the markings. Furthermore, the rotation angle can itself be determined with sufficient precision given high rotation frequencies up to the point of the maximum possible rotation frequencies of the gantry of the x-ray computed tomography apparatus.

The above object also is achieved in accordance with the invention by a method for measurement of the rotation angle of a rotor relative to a stator, including the steps of filtering the raw measured by means of a low-pass filter before conversion thereof into the output signal. The advantages of the device apply in an analogous manner for the method. The method enables a simple and precise measurement of the rotation angle. In a preferred embodiment of the method, a PLL circuit is used as a low-pass filter.

DESCRIPTION OF THE PREFERRED EMBODIMENTS

Figure 4:
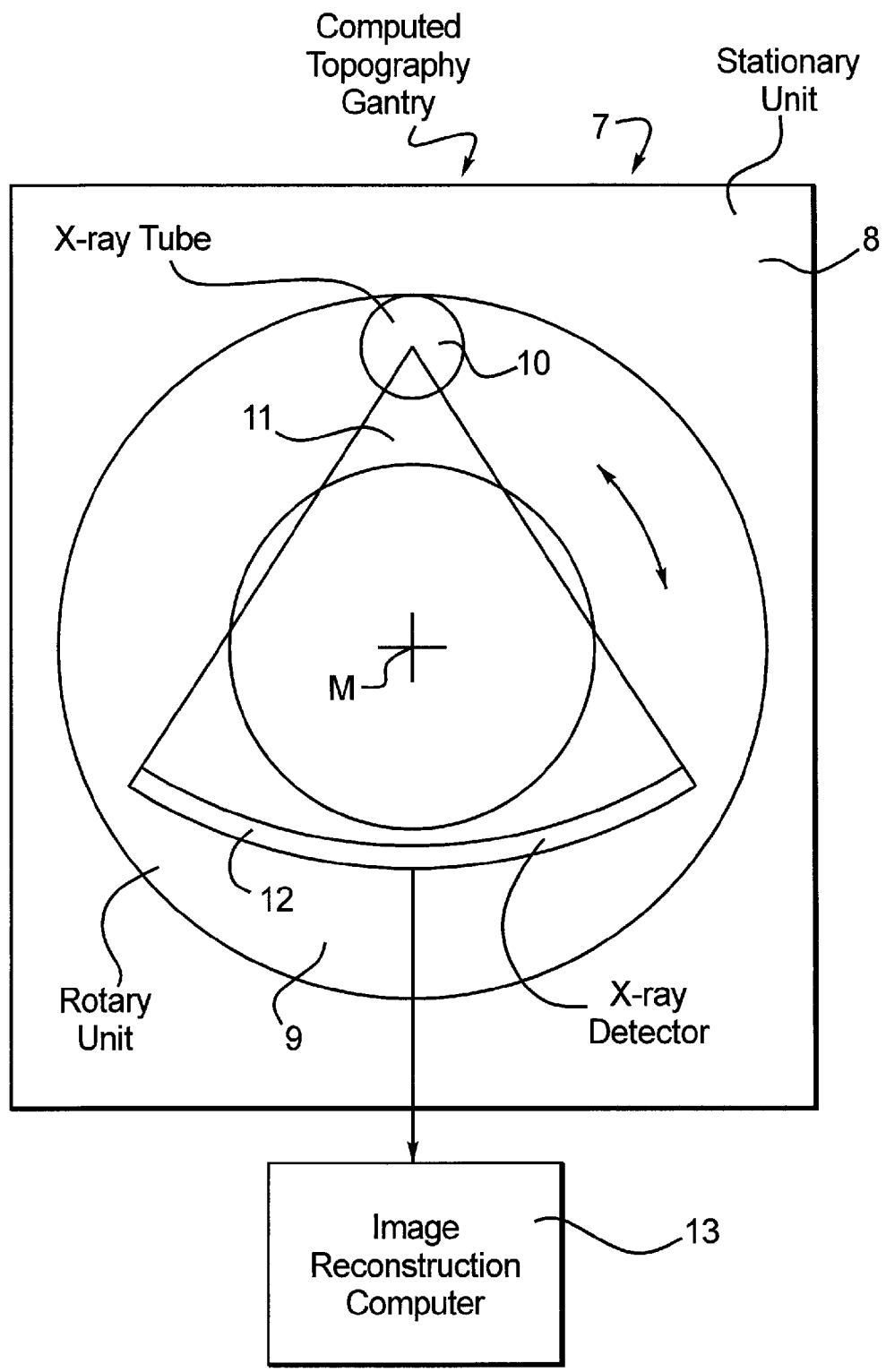
FIG. 4 schematically illustrates the basic components of a conventional computed tomography gantry, connected to an image reconstruction computer.

As shown in FIG. 4, a conventional computed tomography gantry 7 has a stationary unit 8 in which a rotary unit 9 is mounted for rotation around a center axis M, as indicated by the curved double arrow. Mounted on the rotary unit 9, for co-rotation therewith, are an x-ray tube 10, that emits an x-ray beam 11, and a radiation detector 12 on which the x-ray beam 11 is incident. The x-ray beam 11 proceeds through a central opening in the stationary unit 8 and the rotary unit 9, in which an examination subject (not shown) is received. X-rays in the x-ray beam 11, attenuated by the examination subject, are detected by the x-ray detector 12 and are supplied, as detector data, to an image reconstruction computer 13. The image reconstruction computer 13 reconstructs an image of the examination subject in a known manner from the detector data. In conventional image reconstruction algorithms, it is necessary to know the rotational angle of the x-ray tube 10, and thus the rotational angle of the rotary unit 9, that existed when the detector data were generated.

Figure 1:
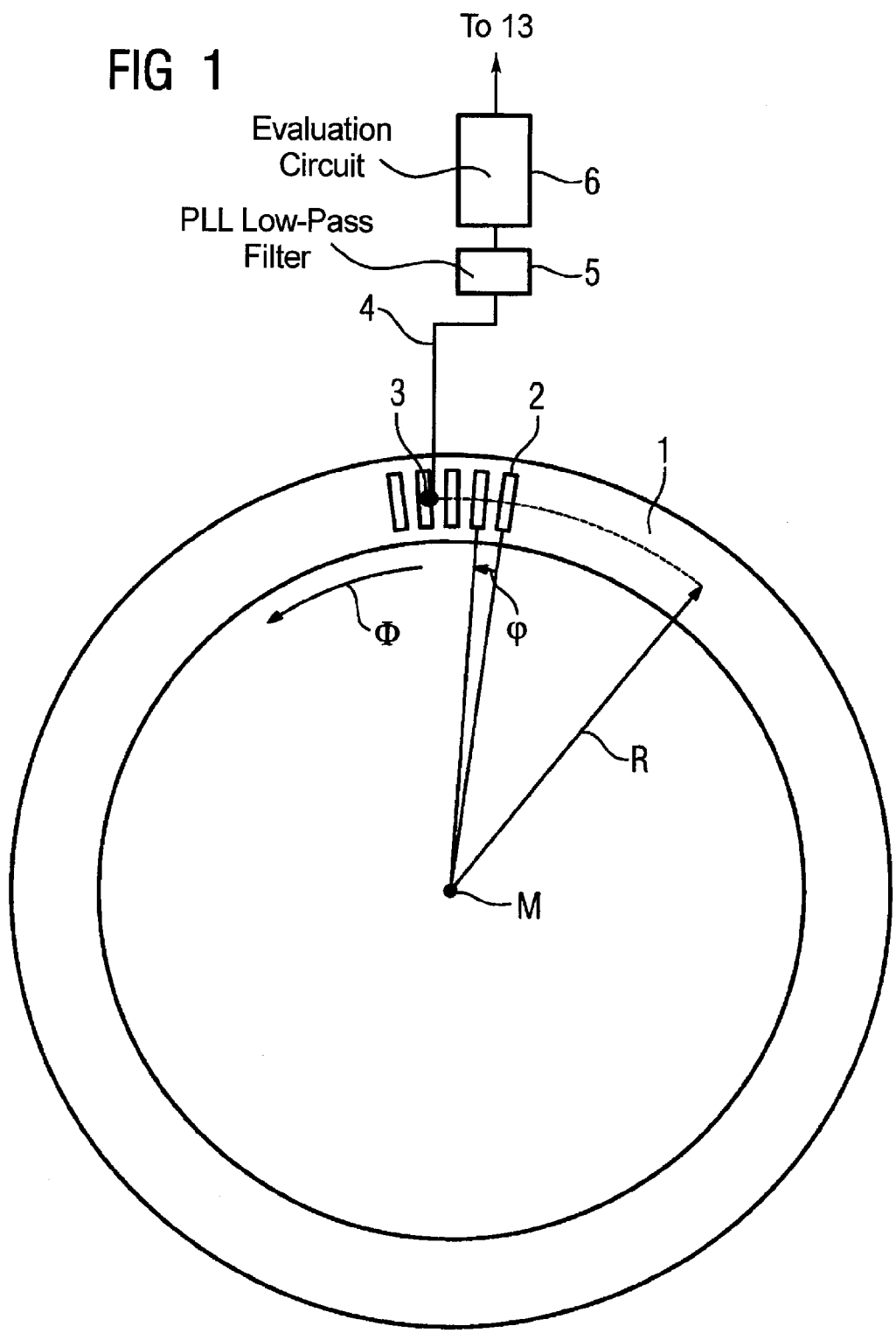
FIG. 1 schematically illustrates a device for measurement of the rotation angle in accordance with the invention.

FIG. 1 shows an inventive device for measurement of the rotation angle in a CT gantry of the type shown in FIG. 4. A slit disc 1 is fashioned in the form of an annulus and is supported, in this embodiment, such that it can rotate around the axis M with the rotary unit 9. The slit disc 1 has a number of radially circumferential slits 2. The slits 2 are uniformly distributed on the slit disc 1 and are separated from one another in a Φ-direction Φ by a rotation angle φ. A light barrier 3 is mounted stationary, in this embodiment, opposite the slit disc 1. The light barrier 3 is mounted at a radial distance R from the axis M. The reference character 4 designates a signal line. The light barrier 3 is connected with the signal line 4 via a PLL circuit 5, followed by an evaluation circuit 6.

Figure 2:
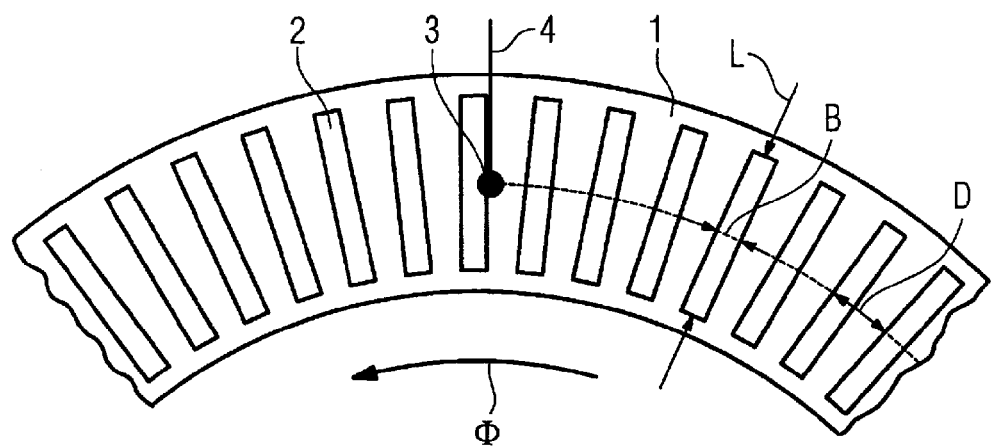
FIG. 2 shows a segment of a slit disc according to FIG. 1.

FIG. 2 shows a segment of the slit disc according to FIG. 1. The slits 2 exhibits a length L in the radial direction and a width B in the Φ-direction Φ. The slits recur at a radial interval R from the axis M with a period D.

The functioning of the device is as follows:

Given a rotation of the slit disc 1 relative to the light barrier 3 in the Φ-direction Φ, the slits 2 are moved past the light barrier 3. The light barrier 3 detects the slits 2 and generates an electrical signal for each slit 2 moving past the light barrier 3. Under the assumption of ideal slits 2, i.e. slits 2 with the same width B and period D, the signals are exactly periodical with a period D. After a period D, the slit disc 1 has rotated further by the rotation angle 100. The signals exhibit signal fluctuations due to oscillations in the width B or the period D. The signals are conducted to the PLL circuit 5 via the signal line 4. The signals are filtered with the PLL circuit 5. The signal fluctuations are suppressed or filtered out. The filtered signals are supplied to the evaluation device 6. The evaluation circuit 6 converts the filtered signals into a measurement signal corresponding to the respective rotation angle φ. The measurement signal is particularly precise due to the filtering with the PLL circuit 5. This precisely determined measurement signal representing the rotation angle φ is supplied from the evaluation device 6 to the image reconstruction computer 13 for use therein, in a known manner, for reconstructing an image from the output of the radiation detector 12.

Given a slit disc 1 with a radial interval R=0.5 m and 1200 uniformly-distributed slits 2, for example as used in the field of x-ray computed tomography, the period D or the rotation angle φ amounts to 18 angular minutes. This corresponds to an interval of approximately 2.5 mm. A fluctuation of the interval or of the width B by, for example, 0.025 mm can cause a relative signal fluctuation by 1%. Such signal fluctuations can be detrimental to the quality of an exposure of the x-ray computed tomography apparatus. It is also possible for the slit disc 1 to be stationary and the light barrier 3 to rotate in computed tomography. Light barriers 3 conventionally exhibit a small mass. A balancing of the rotor is easy.

Figure 3:
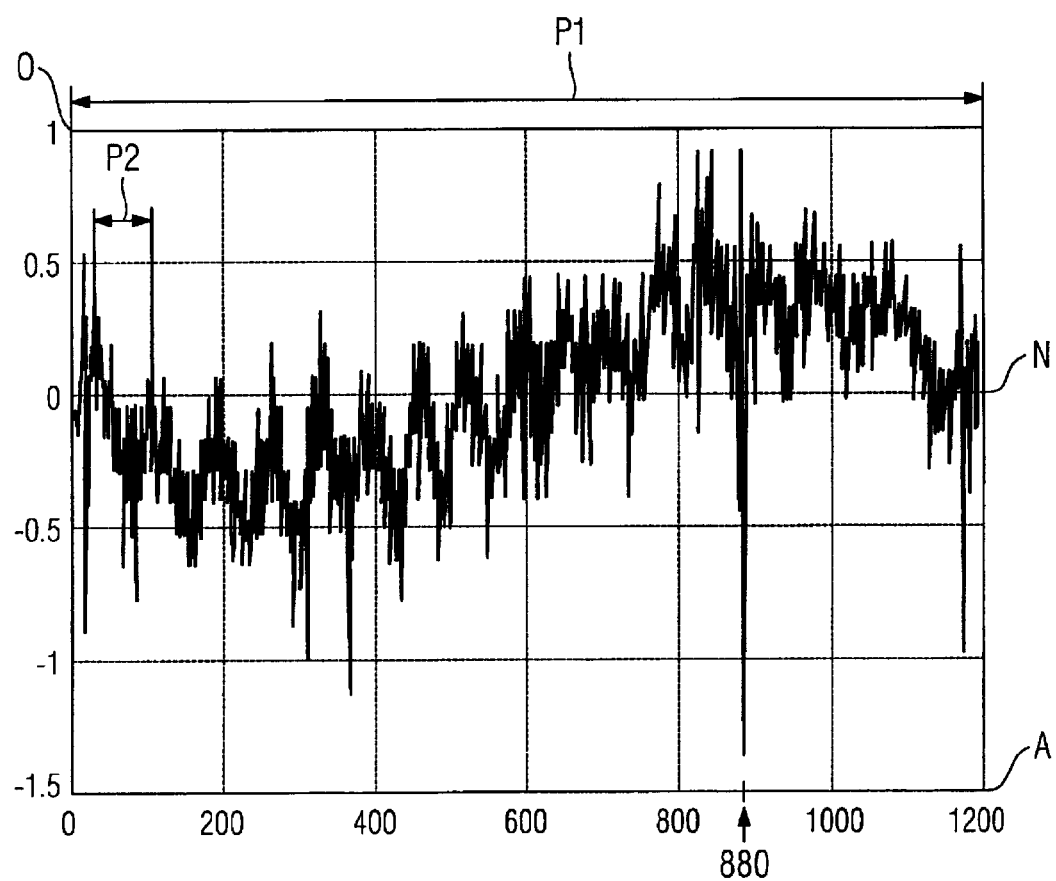
FIG. 3 is a diagram illustrating signal fluctuations of the type avoided by the use of the invention.

FIG. 3 shows typical relative signal fluctuations in a diagram. The signal fluctuations respectively represent to a rising flank of the signal in question. The rising flank of the signal is designated as an angle pulse in the following. The signal fluctuations of the angle pulses are plotted on the ordinate axis O relative to a nominal frequency. The nominal frequency is the signal frequency of the angle pulses that an ideal slit disc 1 would generate. Consecutive numbers are plotted on the abscissa axis A, indicating the angle pulses for a 360-degree revolution of the slit disc 1. First and a second oscillation periods of first and second sinusoidal oscillations are designated with P1 and P2. The number 880 is indicated with an arrow.

The diagram of FIG. 3 essentially shows three different interferences for relative signal fluctuations. First interferences can be described by a first sinusoidal oscillation of the signal fluctuations around the zero line N. The first period (designated with the reference character P1) of the first sinusoidal oscillation corresponds to a 360-degree rotation of the slit disc 1. Second interferences can be described by a second sinusoidal oscillation superimposed on the first sinusoidal oscillation. The second period P2 (designated with the reference character P2) of the second sinusoidal oscillation is smaller than the first period P1. The period ratio P1: P2 amounts to approximately 1:17. Third interferences are arbitrarily distributed over the 360-degree rotation of the slit disc 1. For example, the angle pulse 880 exhibits a large relative signal fluctuation of approximately 1.35%.

The causes of the first through third interferences are the following:

The first interferences can be caused by a periodically-varying rotation speed, for example due to an imbalance (out-of-balance). The second interferences can be caused by periodic regular oscillations of the drive of the rotor. Furthermore, the second interferences (and, in the same manner, third interferences) can be caused by fluctuations in the widths B or periods D of the slits.

The first through third interferences lead to signal fluctuations of the signals. The first interference can essentially be remedied by a weighting of the rotor. The second and third interferences can be suppressed in a simpler manner with a low-pass filtering, such that a particularly precise measurement of the rotation angle φ is possible.

Although modifications and changes may be suggested by those skilled in the art, it is the intention of the inventor to embody within the patent warranted hereon all changes and modifications as reasonably and properly come within the scope of his contribution to the art.

I claim as my invention:

1. An x-ray computed tomography gantry comprising:
    a stator;
    a rotor mounted for rotation relative to said stator through a rotation angle;
    an x-ray tube that emits an x-ray beam and a radiation detector on which said x-ray beam is incident, said x-ray tube and said radiation detector being mounted on said rotor for co-rotation therewith and being configured to irradiate a subject, disposed between said x-ray tube and said radiation detector, to generate detector data representing said x-ray beam attenuated by the subject;

a disc comprising a plurality of circumferentially disposed, spaced markings;

a detection device that detects said markings, one of said disc or said detection device being co-rotatable with said rotor and said detection device generating electrical signals at an output thereof representing relative movement between said markings and said detection device while said detector data are being generated;

a low-pass filter connected to the output of said detection device that low-pass filters said electrical signals, to produce a low-pass filtered signal at an output thereof;

an evaluation device connected to the output of said low-pass filter that converts said low-pass filtered signal into a measurement signal representing said rotation angle; and an image reconstruction computer supplied with said measurement signal and supplied with said detector data, that reconstructs an image of the subject by executing an image reconstruction algorithm employing said detector data and said rotation angle.

2. A gantry as claimed in claim 1 wherein said low-pass filter comprises a phase-locked loop circuit.

3. A gantry as claimed in claim 1 wherein said disc comprises a plurality of through-holes therein at a circumference thereof, forming said markings.

4. A gantry as claimed in claim 3 wherein said through-holes are slit-shaped.

5. A gantry as claimed in claim 1 wherein said detection device comprises a light barrier.

6. A gantry as claimed in claim 1 wherein said markings are selected from the group consisting of magnetic markings, electronic markings, and optical markings.

7. A gantry as claimed in claim 1 wherein said disc is co-rotatable with said rotor.

8. A method for generating a computed tomography image of a subject including measuring a rotation angle of a rotor of a gantry of a computed tomography apparatus relative to a stator of the gantry, comprising the steps of:

providing an x-ray source that emits an x-ray beam, and a radiation detector on which said x-ray is incident, on said rotor and rotating said rotor with said x-ray source and said radiation detector thereon to irradiate a subject, disposed between said x-ray source and said radiation detector, to generate detector data representing said x-ray beam attenuated by the subject;

providing a disc with a plurality of circumferentially disposed, spaced markings;

co-rotating one of said disc and said detection device with said rotor while obtaining said detector data and generating an electrical signal from the detector device indicative of said relative movement;

low-pass filtering said electrical signals to produce a low-pass filtered signal;

electronically evaluating said low-pass filtered signal to generate a measurement signal representing said rotation angle; and automatically electronically reconstructing an image of the subject by executing a computerized image reconstruction algorithm employing said detector data and said rotation angle.

9. A method as claimed in claim 8 comprising low-pass filtering said electrical signal with a phase-locked loop circuit.

* * * * *